United States Patent [19]

Dent et al.

[11] 4,209,945
[45] Jul. 1, 1980

[54] PLANT GROWTH PACKAGE

[75] Inventors: Enid-Mary Dent, London, England; Arthur A. Anderson, New York, N.Y.

[73] Assignee: Capability Brown Limited, New York, N.Y.

[21] Appl. No.: 940,886

[22] Filed: Sep. 11, 1978

Related U.S. Application Data

[63] Continuation-in-part of Ser. No. 913,309, Jun. 7, 1978, abandoned.

[51] Int. Cl.² ............................................. A01G 9/10
[52] U.S. Cl. ........................................... 47/84; 119/1; 47/66; 229/52 B
[58] Field of Search .................. 47/73, 74, 77, 84, 87, 47/66, 56, 64; 229/52 B; 119/1

[56] References Cited

U.S. PATENT DOCUMENTS

| | | | |
|---|---|---|---|
| 2,723,027 | 11/1955 | Guyer | 229/52 B X |
| 2,768,741 | 10/1956 | Currie | 229/52 B X |
| 3,032,927 | 5/1962 | Kobs | 47/73 |
| 3,044,211 | 7/1962 | Palm | 229/52 B |
| 3,094,268 | 6/1963 | Swanson et al. | 229/52 B |
| 3,172,234 | 3/1965 | Eavis | 47/87 X |
| 3,362,106 | 1/1968 | Goldring | 47/56 |
| 3,384,224 | 5/1968 | Buckholz et al. | 229/52 B X |
| 3,524,279 | 8/1970 | Adams | 47/87 |
| 3,613,309 | 10/1971 | Coburn | 47/64 X |
| 3,707,806 | 1/1973 | Toews et al. | 47/87 |
| 3,733,745 | 5/1973 | Ingerstedt et al. | 47/77 |
| 3,755,964 | 9/1973 | Rack | 47/74 |
| 3,962,823 | 6/1976 | Zipperer | 47/73 |
| 3,971,160 | 7/1976 | Vajtay | 47/84 |

FOREIGN PATENT DOCUMENTS 1365913  9/1974  United Kingdom .
1409791 10/1975 United Kingdom ........................ 47/84

OTHER PUBLICATIONS

Cornell Peat Lite Mixes . . . , Boodley et al., "Flor 12766," Cornell, Univ., Ithica, N.Y.

Primary Examiner—Robert E. Bagwill
Attorney, Agent, or Firm—Cantor and Singer

[57] ABSTRACT

A package for a flowable material such as a plant growth medium and which can be converted for use as a container for growing plants therein. The package has an elongated or square flexible outer container and is filled with the flowable filling material. The container has markings for cutting out a pair of openings at either end of the top surface to thereby leave a carrying handle in the middle.

12 Claims, 6 Drawing Figures

PLANT GROWTH PACKAGE

CROSS-REFERENCE TO RELATED APPLICATION

This application is a continuation-in-part of our co-pending application Ser. No. 913,309, filed June 7, 1978, now abandoned.

BACKGROUND OF THE INVENTION

This invention relates to packages, and more particularly this invention relates to a package for flowable material which can be converted to use as a container for actually using the flowable material.

Various flowable materials for different uses are commonly available and widely used. For instance, it is common practice to purchase potting soil, plant nutrient media, and the like, as well as so-called cat litter and other particulate materials used for other purposes.

Potting soil, for instance, is purchased in bags or other containers and is then filled into flower pots or the like for its ultimate use. Similarly, plant growth media are purchased in bags and transferred to flower pots, "flats", and other containers for sowing seeds therein or planting already growing plants therein.

In the case of cat litter, the material is commonly purchased in plastic or paper bags and transferred to a low, flat container such as a box or a plastic basin wherein domesticated cats are trained to relieve themselves. The contaminated litter is then gathered up and disposed of. This, of course, is a rather unsanitary condition.

Whatever the purpose of the flowable material used, there is great inconvenience in its method of use in that a separate receptacle must be provided and the package in which the material is purchased is usually destroyed, this being rather wasteful.

There is known in the art another plant growth vessel, this being disclosed in British Pat. Specification No. 1,365,913. This British patent discloses an elongated container having a plant growth medium therein. The container has a single longitudinal aperture in the top thereof for opening the package and providing one large growing area. This vessel is made of a thin walled material, generally being from 0.025 to 2.5 mm. Thus, the vessel is non-self-supporting and the vessel, once placed in a particular location, cannot be moved without seriously disturbing the contents.

BRIEF SUMMARY OF THE INVENTION

It is, therefore, a primary object of the present invention to provide a package for flowable materials which is free of the aforementioned and other such disadvantages.

It is another primary object of the present invention to provide a package for flowable material which can be converted for ultimate use as the container in which the flowable material will be utilized.

It is another object of the present invention to provide a package for flowable material which is inexpensive and easily used by the ultimate consumer.

It is yet another object of the present invention to provide a package for flowable material such as plant growth media which can be converted for use in growing plants.

It is still another object of the present invention to provide a package for flowable material such as cat litter which can be converted for use as a sanitary receptacle for receiving animal waste and disposing of same.

Consistent with the foregoing objects, according to the present invention there is provided a package comprising an elongated or square flexible outer container and a flowable filling material, the container having opposed top and bottom walls, opposed side walls, and opposed end walls, the top wall containing indicia denoting a pair of cut-outs which are longitudinally spaced apart on either side of the transverse axis of the top wall, and an integral carrying handle positioned between the cut-outs. The container is constructed of a plastic film or sheet with the thickness being from about 6 mm. to about 10 mm. thick, with the preferred thickness being about 8 mm. The plastic film or sheet can be a polyolefin such as polyethylene or polypropolene, or any other suitable plastic such as polyvinyl chloride. The preferred plastic is polyethylene.

The overall shape of the package could be either pillow-shaped, oval or it could be essentially a box with squared corners. The preferred construction is pillow-shaped. In another embodiment, integral carrying handles may be provided on the ends of the package for carrying the unopened package prior to use.

In another preferred embodiment, the cut-outs are initially cut on three sides and hinged on the fourth partially cover germinating seeds and seedlings, thereby providing a "greenhouse" effect.* After the plants are large enough, the fourth side is cut and the flap removed.

*Used in this manner the flap, cut-out on three of its four sides, serves as a "germination flap" thereby accelerating the germination period of seeds planted outdoors and during this period of use protects seeds and seedlings from direct sunlight, heavy rain or other adverse weather conditions.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
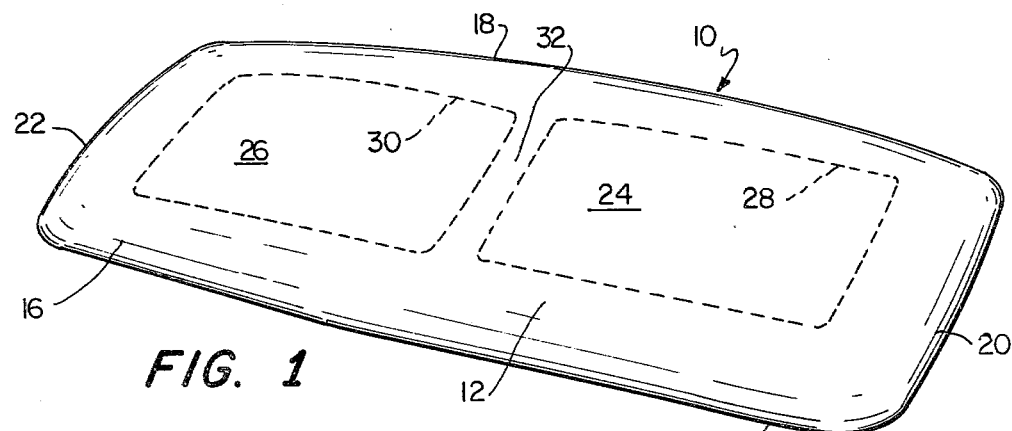
FIG. 1 is a perspective view of the package of the present invention.

According to the present invention, a package generally designated by the numeral 10 is provided. In the preferred embodiment, the package is generally pillow-shaped having what could be considered a top wall 12 and an opposed bottom wall 14, two opposed side walls 16 and 18, and opposed end walls 20 and 22. A pair of longitudinally spaced apart cut-outs 24 and 26 are provided by indicia 28 and 30 which could be merely printed indicia for guiding the user to make the cut-outs with scissors or some other sharp implement, or could be perforations. The cut-outs are preferably square or rectangular in shape although they could be round or oval. It is preferred to merely have printed indicia. The cut-outs 24 and 26 are spaced on either side of the transverse axis of top wall 12. Thus, there is left an integral carrying handle 32. Since the material of which the package is made is a heavy-weight plastic, carrying handle 32 will support the weight of the package in carrying it from one location to another. This is especially helpful when the package is converted for use in growing plants and is kept on a balcony or the like of a city dwelling. As the sun shifts, it might be necessary to move the receptacle in which the plants are growing in order to obtain the maximum benefit thereof.

Figure 2:
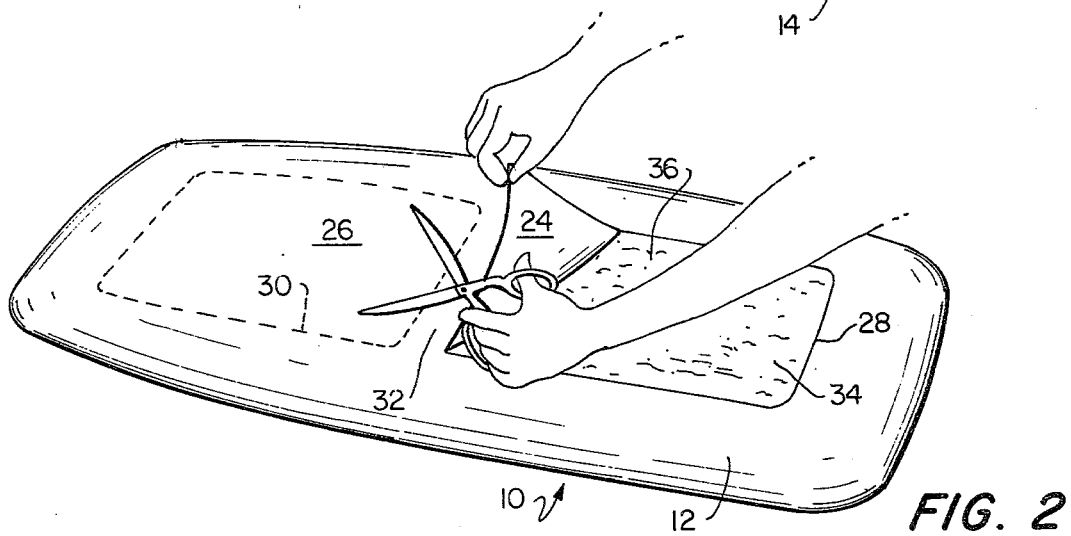
FIG. 2 is a perspective view of the package of FIG. 1 showing the method of opening the same.
Figure 3:
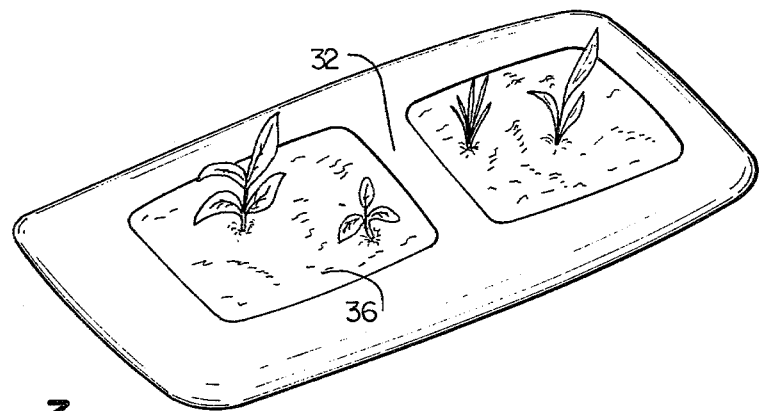
FIG. 3 is a perspective view of the package of FIG. 1 converted for use in growing plants.

Referring to FIG. 2, the method of converting the package for use is shown. The user merely cuts along indicia 28 or 30 and removes the cut-out flap 24 or 26 to leave an opening designated in FIG. 2 as 34 filled with a flowable material 36. In the preferred embodiment shown in FIG. 3, the flowable material 36 is a plant growth medium. In another embodiment, which is not shown, the flowable material could be cat litter. In that instance, the cat would leave its waste in the litter showing through openings 34 and the owner would dispose of the used material by lifting, using handle 32 and disposing of the complete package in the usual manner.

Figure 4:
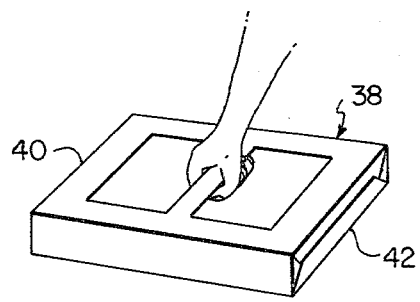
FIG. 4 is a perspective view of another embodiment of a package according to the instant invention.

Another embodiment is shown in FIG. 4 wherein the package designated as 38 is generally rectangular in cross-section rather than oval or free-form. It is also constructed of heavy gauge plastic such as polyethylene and has squared-off ends 40 and 42 constructed in a common manner by over-lapping end flaps and sealing by means of heat or other known methods.

Figure 5:
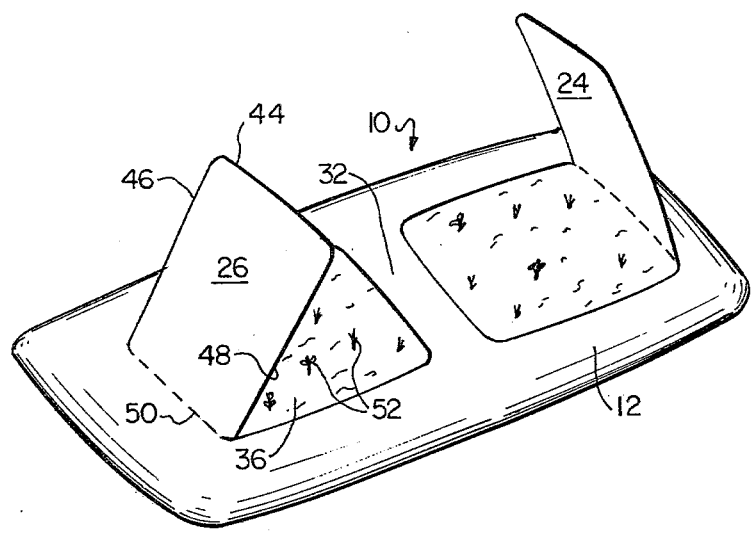
FIG. 5 is a perspective view of a preferred embodiment of the use of the inventive package.

Referring to FIG. 5, the package generally designated by the numeral 10 is the same as the package of FIG. 1, having cut-outs 24 and 26 and carrying handle 32 in top wall 12. In using this embodiment, however, rather than cutting completely around indicia 28 and 30 to remove cut-outs 24 and 26, respectively, as in FIG. 1, the cut-outs are only partially removed initially. It will be seen that cut-out 26, for instance, is defined by sides 44, 46, 48, and 50. By cutting only three sides, 44, 46, and 48, and using side 50 as a hinge, a flap is formed which acts as a temporary "greenhouse". After watering and planting seeds, the flap is allowed to cover the planted seeds protecting them from wind and rain which can disrupt the seeds. It also maintians the moisture and heat in a manner similar to a greenhouse. When the seeds germinate, the flap can gradually be lifted, propped up if need be, and eventually cut off at the hinged side and discarded. Obviously, while the flap 46 is depicted in FIG. 5 as being hinged at side 50, it can be hinged on any one of the four sides depending on the needs or desires of the user. Cut-out 24 is hinged in the same manner as cut-out 26.

Figure 6:
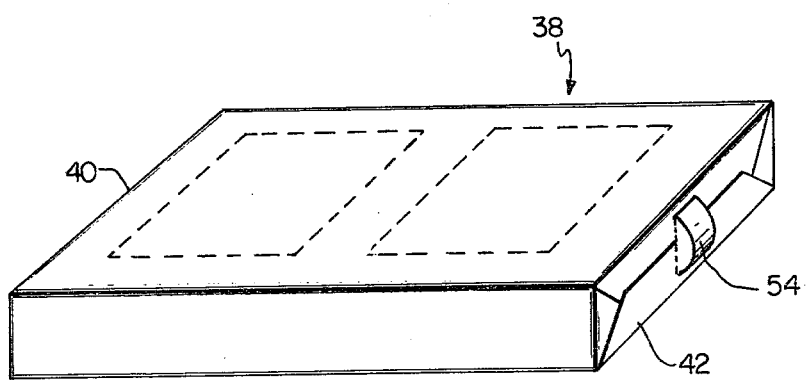
FIG. 6 is a perspective view of the package of FIG. 4 illustrating still another embodiment.

In the embodiment shown in FIG. 6, package 38 has an integral carrying handle 54 centrally located on end 42. If desired, another such carrying handle could be located on end 40. This carrying handle 54 provides for ease in carrying the package before its actual use.

When using the package of the present invention for a plant growth medium, any well-known plant growth medium can be utilized. The actual composition of the medium is immaterial to the present invention since it will vary according to the type of plant being grown, the type of raw materials available in any particular geographical area, and the like. One composition which has been used successfully is that suggested by J. W. Boodley and R. Sheldrake, Jr., of Cornell University. The formula for a one bushel mix is given as:

| Ingredient | Amount |
| --- | --- |
| Vermiculine No. 2 Size Horticultural | ½ bushel |
| Shredded Canadian or German Sphagumum Peat Moss | ½ bushel |
| Ground Limestone, preferably Dolomitic | 4 tablespoons |
| Powdered Superphosphate 20% | 1 tablespoon |
| 5-10-5 Fertilizer | 8 tablespoons |

The materials are mixed thoroughly and moistened if necessary to reduce dusting. It was suggested by Messrs. Boodley and Sheldrake that "pillow paks" made of 4 to 6" diameter clear or black polyethylene, of any convenient length, be filled with this mixture. The ends would then be folded over and stapled shut. Small holes for individual plants would be cut at appropriate spacing. The physical construction of these "pillow paks" was crude and no commercial success was enjoyed. The importance of this prior art is the formula for the plant growth medium. Another description of a suitable plant growth medium appears on the first page of the aforementioned British Pat. No. 1,365,913.

It should be apparent from the foregoing detailed description that the objects set forth hereinabove have been successfully achieved. Moreover, while there is shown and described a present preferred embodiment of the invention, it is to be distinctly understood that the invention is not limited thereto but may be otherwise variously embodied and practiced within the scope of the following claims. Accordingly,

What is claimed is:

1. A package comprising an elongated flexible outer container and a flowable filling material, said container having opposed top and bottom walls, opposed side walls, and opposed end walls, said top wall containing indicia denoting a pair of cut-outs longitudinally spaced apart on either side of the transverse axis of said top wall, and spanning the major portion thereof, and an integral carrying handle positioned between said cut-outs and extending along said transverse axis, the material forming said cut-outs being adapted to be hinged open along one side thereof.

2. A package as defined in claim 1, wherein said flowable filling material is liquid absorbent whereby said package is usable as a disposable domestic animal refuse container.

3. A package as defined in claim 1, wherein said flowable filling material is a plant growth medium.

4. A package as defined in claim 1, wherein said container is constructed of a plastic film.

5. A package as defined in claim 4, wherein said film is a polyolefin.

6. A package as defined in claim 5, wherein said polyolefin is polyethylene.

7. A package as defined in claim 1, wherein said container is generally pillow-shaped.

8. A package as defined in claim 7, wherein said package is oval in cross-section.

9. A package as defined in claim 1, wherein said container is rectangular in cross-section.

10. A package as defined in claim 9, further comprising a carrying handle located on at least one of said end walls and integral therewith.

11. A package as defined in claim 1, wherein said cut-outs are square or rectangular.

12. A package as defined in claim 1, wherein said cut-outs are round or oval.

* * * * *